Nov. 19, 1929.　　　A. I. ADDISON　　　1,736,107
PIMIENTO ROASTER
Original Filed March 7, 1927　　2 Sheets-Sheet 1
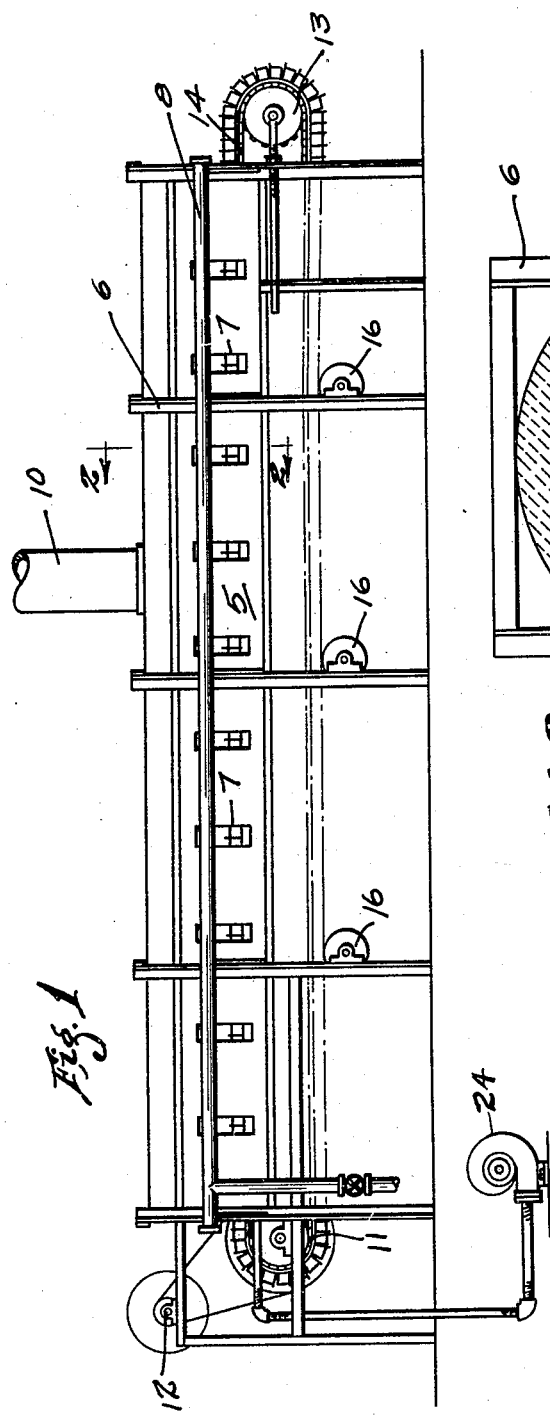
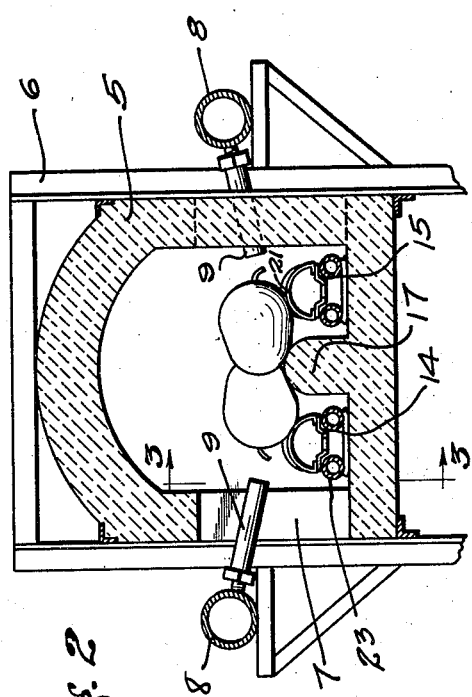
INVENTOR.
Amos Ivan Addison
BY Westall and Wallace
ATTORNEYS Nov. 19, 1929.  A. I. ADDISON  1,736,107
PIMIENTO ROASTER
Original Filed March 7, 1927   2 Sheets-Sheet 2
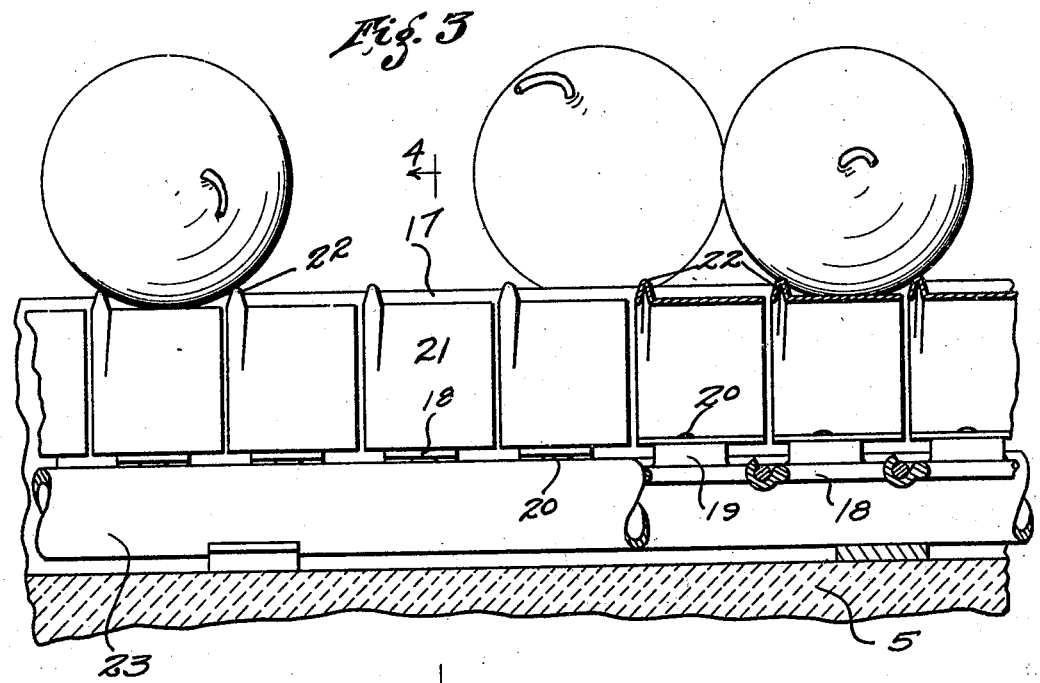
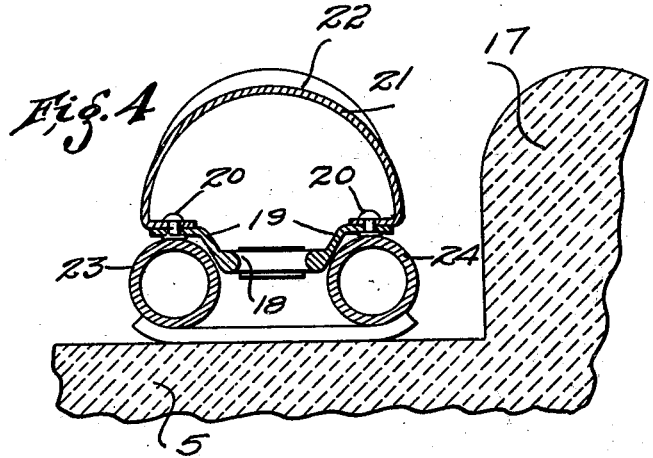
INVENTOR.
Amos Ivan Addison
BY
ATTORNEYS Patented Nov. 19, 1929

1,736,107

UNITED STATES PATENT OFFICE

AMOS IVAN ADDISON, OF LONG BEACH, CALIFORNIA, ASSIGNOR, BY MESNE ASSIGNMENTS, TO STEWART CURTIS PACKERS, INC., OF LOS ANGELES, CALIFORNIA, A CORPORATION OF DELAWARE

PIMIENTO ROASTER

Original application filed March 7, 1927, Serial No. 173,593. Divided and this application filed February 15, 1928. Serial No. 254,339.

This invention relates to a roaster for pimientos and the like, wherein the substance or article under treatment is exposed directly to the open flame of the heating medium. In the preparation of pimientos for human consumption, it is desirable to remove the outer peel. The present invention appertains to a roaster wherein the peel of pimientos or the like is burnt to crisp or carbonized, so that they may be readily removed from the fruit by subjection to the washing action of jets of water, or by any other suitable after treatment. The invention disclosed herein is especially useful in a roaster of the type disclosed and claimed in a patent for pimiento roasters, No. 1,660,061, filed March 7, 1927, by me, and of which the present application is a division.

The objects of this invention are: first, to provide a roaster having a conveyor which travels through a tunnel-like oven, in which it is subjected to heat and which conveyor is cooled in its transit through the oven so as to prevent damage thereto; second, to provide a conveyor of the endless type which rides through the oven on rails which are cooled to keep the temperature of the conveyor below the point at which damage might occur to it; and third, to provide details of structure whereby a simple, economical, efficient and long lived structure is obtained.

Other objects and advantages will be made fully apparent from the following specification considered in connection with the accompanying drawings, in which:

Fig. 1 is an elevation of a roaster constructed in accordance with my invention; Fig. 2 is a cross section of the roaster on an enlarged scale as seen on the line 2—2 of Fig. 1; Fig. 3 is a fragmentary longitudinal section on an enlarged scale as seen on the line 3—3 of Fig. 2, showing details of the carrier chain; and Fig. 4 is a cross section of one of the carrier chains, as seen on the line 4—4 of Fig. 3.

Referring with more particularity to the drawings, the roaster comprises a tunnel-like oven structure 5 of fire brick or similar heat resisting material, supported and tied together with a suitable iron frame work 6. The oven is open at the ends and is provided with a series of openings 7 in its sides, rows on one side preferably being in staggered relation to those on the other side. Extending longitudinally along each side of the oven and supported on suitable brackets secured to the frame work of the oven are gas pipes 8 to which are connected burners 9 projecting inwardy through the openings in the side walls of the oven. A chimney 10 is mounted on the oven roof to carry off the products of combustion. Mounted in bearings on one end of the frame work 6 is a shaft carrying a pair of sprocket wheels 11 and arranged to be driven from a counter shaft 12. A shaft and similar sprocket wheels 13 are supported at the opposite ends of the oven, adjustment means to move the shaft in a horizontal direction and take the slack out of the chains, preferably being provided. A pair of chains 14 and 15 are mounted on the sprockets, the upper reach of the chains travelling through the oven, and the lower reach being carried beneath it on suitable idlers 16. Between the chains within the oven is a parapet wall or curb 17, preferably of the same material as the oven and having a rounded top.

As the chains are similar, only one will be described. It consists of a number of links 18 pivotally secured together, each link having outstanding arms 19 at the sides, to which is secured, as by rivets 20, a semi-circular shell 21, preferably formed of sheet metal and having an upstanding lip 22 at one end. Supported on the floor of the oven and secured together in spaced relationship are pipes 23 and 24. These support the chain which slides thereon on the heads of rivets 20, the sides of the links 18 serving to hold it in place laterally. The wear incident to the sliding of the chains through the oven on the pipes is taken by these rivets, which may be easily replaced when necessary. These pipes are provided with suitable connections not shown, whereby a circulation of water or cooling fluid may be maintained through them.

The operation of the roaster is as follows: The gas from the burners having been ignited and the chains having been set in motion, the fruit which it is desired to roast is fed to the chains at one end of the roaster in a sufficiently small quantity so that it will form only a single layer thereon with some space between the individual pieces. These lie partly on the shells 21 of one or the other chain and partly on the wall 17 as clearly shown in Fig. 2. As the chains advance into and through the oven, the lips 22 move the fruit along with them into the oven where it is exposed to the flames issuing from the burners 9. Fruit being substantially spheroidal in shape and by reason of resting partly on the moving chain and partly on the stationary wall, is rolled or turned in various directions as it advances, thus continually exposing fresh parts of the surface to the action of the flames. The fruit after having been conveyed to the oven is discharged at the opposite end from that which it enters, where it may be removed from the chains by hand or other suitable means. It is then ready for further treatment.

The portions of the chains within the oven will be subjected to the heat of the flames and liable to damage as a result. The chains ride through the furnace on pipes 23, forming rails as before described, which are kept cool by circulating cooling fluid such as water through them as by a pump 24. As the chains are in contact with the pipe rails, a portion of the heat absorbed by the former will be conducted away by the latter, which results in keeping the temperature of the chains below the point at which damage might occur.

What I claim is:—

1. A device of the character described including an oven, heating means for said oven, a carrier chain disposed to travel through said oven, said carrier chain comprising links pivotally secured together and having outstanding arms, and spaced parallel guides in said oven adapted to slidably engage said outstanding arms thereby supporting and guiding said chain with the links depending between said guides, said guide means being adapted to be maintained at a temperature below that of said oven.

2. A device of the character described including an oven, heating means for said oven, a carrier chain arranged to be moved through said oven, said carrier chain comprising links pivotally secured together, each link having a pair of outstanding arms, and tubular guide rails in parallel spaced relation upon which said arms are supported with said links depending between said rails, said guide rails being adapted to have cooling fluid circulated therethrough whereby said rails and said chains are maintained below the temperature of said oven.

3. A device of the character described including an oven, heating means for said oven, a carrier chain arranged to be moved through said oven, said chain comprising links, each link having a pair of outstanding arms, a curved shell secured to said outstanding arms by means of rivets, guide means for said chain comprising a pair of laterally spaced pipes adapted to slidably engage the rivets in said arms whereby the wear incident to said links riding over said pipe is taken by said rivets and heat transferred between said chain and pipes, and means to pass cooling fluid through said pipe whereby the temperature of said pipes and said chains are maintained below the temperature of said oven.

4. The combination of a carrier chain, comprising links, each link including a pair of outstanding arms, a curved shell secured to said outstanding arms by means of rivets, tubular guide rails for said chain supporting said arms and slidably engaged with rivets, whereby the wear incident to said links being moved over said rails is taken by said rivets and heat transferred between said chain and rails, said guide rails being adapted to have cooling fluid passed therethrough.

5. The combination of a carrier chain comprising links, each link having a pair of outstanding arms, a curved shell secured to said outstanding arms by means of rivets, tubular guide rails for said chain comprising a pair of laterally spaced pipes adapted to support said arms and slidably engaged with said rivets whereby the wear incident to said links being moved over said pipe is taken by said rivets, and means to pass cooling fluid through said pipe.

In witness that I claim the foregoing I have hereunto subscribed my name this 31st day of January, 1928.

AMOS IVAN ADDISON.